United States Patent [19]
Goodwin

[11] Patent Number: 5,823,725
[45] Date of Patent: Oct. 20, 1998

[54] CARGO PROTECTING SECURITY CABLE FOR PICKUP TRUCKS

[76] Inventor: James L. Goodwin, 102 W. 10$^{th}$ #1, The Dalles, Oreg. 97058

[21] Appl. No.: 57,779

[22] Filed: Apr. 9, 1998

[51] Int. Cl.$^6$ ................................................. B60P 7/08
[52] U.S. Cl. ..................... 410/117; 410/102; 410/106; 410/110
[58] Field of Search .............. 410/97, 106, 116, 410/101, 117, 102, 108, 109, 110; 224/403, 42.25, 315, 547, 556, 569; 105/390; 296/43; 24/298, 265 CD; 70/58

[56] References Cited

U.S. PATENT DOCUMENTS

| | | | |
|---|---|---|---|
| D. 309,251 | 7/1990 | Palmer | D8/367 |
| 1,704,910 | 3/1929 | Bradley | 224/42.25 |
| 2,170,913 | 8/1939 | Rowe | 410/117 |
| 3,677,562 | 7/1972 | Bronstein | 410/97 |
| 3,950,010 | 4/1976 | Robertson | 410/110 |
| 4,191,108 | 3/1980 | Jones | 410/110 |
| 4,316,688 | 2/1982 | Roskelley | 410/102 |
| 4,812,093 | 3/1989 | Millar, Jr. | 410/110 |
| 4,915,556 | 4/1990 | Unger | 410/110 |
| 5,092,504 | 3/1992 | Hannes et al. | 410/3 X |
| 5,273,382 | 12/1993 | Yearick | 411/64 |
| 5,326,203 | 7/1994 | Cockrell | 410/110 |
| 5,440,904 | 8/1995 | Su | 70/58 X |

*Primary Examiner*—Stephen T. Gordon

[57] ABSTRACT

A new cargo protecting security cable for pickup trucks for securing belongings carried in a bed on an uncovered pickup truck. The inventive device includes a pair of anchor portions securable within opposing stake pockets of a pickup truck bed and having a pair of apertures therethrough. A locking cable extends between large apertures of the pair of anchor portions. A first end of the locking cable extends through the large aperture of the second anchor portion and being fixedly secured thereto. The large aperture of the first anchor portion has a locking cylinder disposed therein. The locking cylinder receives a second end of the locking cable in a locked orientation.

4 Claims, 2 Drawing Sheets

CARGO PROTECTING SECURITY CABLE FOR PICKUP TRUCKS

BACKGROUND OF THE INVENTION

1. Field of the Invention

The present invention relates to tie down anchors for pickup trucks and more particularly pertains to a new cargo protecting security cable for pickup trucks for securing belongings carried in a bed on an uncovered pickup truck.

2. Description of the Prior Art

The use of tie down anchors for pickup trucks is known in the prior art. More specifically, tie down anchors for pickup trucks heretofore devised and utilized are known to consist basically of familiar, expected and obvious structural configurations, notwithstanding the myriad of designs encompassed by the crowded prior art which have been developed for the fulfillment of countless objectives and requirements.

Known prior art tie down anchors for pickup trucks include U.S. Pat. No. 5,273,382 to Yearick; U.S. Pat. No. 4,812,093 to Millar, Jr.; U.S. Pat. No. 4,316,688 to Roskelley; U.S. Pat. No. 4,191,108 to Jones; U.S. Pat. No. 5,440,904 to Su; and U.S. Pat. No. Des. 309,251 to Palmer.

While these devices fulfill their respective, particular objectives and requirements, the aforementioned patents do not disclose a new cargo protecting security cable for pickup trucks. The inventive device includes a pair of anchor portions securable within opposing stake pockets of a pickup truck bed and having a pair of apertures therethrough. A locking cable extends between small apertures of the pair of anchor portions. A first end of the locking cable extends through the small aperture of the second anchor portion and being fixedly secured thereto. The small aperture of the first anchor portion has a locking cylinder disposed therein. The locking cylinder receives a second end of the locking cable in a locked orientation.

In these respects, the cargo protecting security cable for pickup trucks according to the present invention substantially departs from the conventional concepts and designs of the prior art, and in so doing provides an apparatus primarily developed for the purpose of securing belongings carried in a bed on an uncovered pickup truck.

SUMMARY OF THE INVENTION

In view of the foregoing disadvantages inherent in the known types of tie down anchors for pickup trucks now present in the prior art, the present invention provides a new cargo protecting security cable for pickup trucks construction wherein the same can be utilized for securing belongings carried in a bed on an uncovered pickup truck.

The general purpose of the present invention, which will be described subsequently in greater detail, is to provide a new cargo protecting security cable for pickup trucks apparatus and method which has many of the advantages of the tie down anchors for pickup trucks mentioned heretofore and many novel features that result in a new cargo protecting security cable for pickup trucks which is not anticipated, rendered obvious, suggested, or even implied by any of the prior art tie down anchors for pickup trucks, either alone or in any combination thereof.

To attain this, the present invention generally comprises a pair of anchor portions securable within opposing stake pockets of a pickup truck bed. The pair of anchor portions include a first anchor portion and a second anchor portion. The pair of anchor portions each have an upper portion. The upper portion has a flange integral with a lower end of the upper portion. The flange has a width greater than a diameter of the stake pockets. The upper portion has a pair of apertures therethrough. The pair of apertures include a small aperture and a large aperture. The flange has a threaded bolt extending downwardly therefrom. A rubber block is secured around the threaded bolt with a free end extending beyond the rubber block. The rubber block is dimensioned for being received within the stake pockets. A locking nut couples with the free end of the bolt whereby tightening of the bolt against the rubber block would expand the rubber block thereby precluding removal thereof from the stake pocket. A locking cable extends between the small apertures of the pair of anchor portions. A first end of the locking cable extends through the small aperture of the second anchor portion and is fixedly secured thereto. The small aperture of the first anchor portion has a locking cylinder disposed therein. The locking cylinder receives a second end of the locking cable in a locked orientation. The locking cylinder has a key slot extending therein for receiving a key whereby turning of the key within the key slot will release the second end of the locking cable from the locking cylinder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cargo protecting security cable for pickup trucks apparatus and method which has many of the advantages of the tie down anchors for pickup trucks mentioned heretofore and many novel features that result in a new cargo protecting security cable for pickup trucks which is not anticipated, rendered obvious, suggested, or even implied by any of the prior art tie down anchors for pickup trucks, either alone or in any combination thereof.

It is another object of the present invention to provide a new cargo protecting security cable for pickup trucks which may be easily and efficiently manufactured and marketed.

It is a further object of the present invention to provide a new cargo protecting security cable for pickup trucks which is of a durable and reliable construction.

An even further object of the present invention is to provide a new cargo protecting security cable for pickup trucks which is susceptible of a low cost of manufacture with regard to both materials and labor, and which accordingly is then susceptible of low prices of sale to the consuming public, thereby making such cargo protecting security cable for pickup trucks economically available to the buying public.

Still yet another object of the present invention is to provide a new cargo protecting security cable for pickup trucks which provides in the apparatuses and methods of the prior art some of the advantages thereof, while simultaneously overcoming some of the disadvantages normally associated therewith.

Still another object of the present invention is to provide a new cargo protecting security cable for pickup trucks for securing belongings carried in a bed on an uncovered pickup truck.

Yet another object of the present invention is to provide a new cargo protecting security cable for pickup trucks which includes a pair of anchor portions securable within opposing stake pockets of a pickup truck bed and having a pair of apertures therethrough. A locking cable extends between small apertures of the pair of anchor portions. A first end of the locking cable extends through the small aperture of the second anchor portion and being fixedly secured thereto. The small aperture of the first anchor portion has a locking cylinder disposed therein. The locking cylinder receives a second end of the locking cable in a locked orientation.

Still yet another object of the present invention is to provide a new cargo protecting security cable for pickup trucks that prevents items from being removed from a pickup truck bed.

Even still another object of the present invention is to provide a new cargo protecting security cable for pickup trucks that will coupled with existing stake pockets of the pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
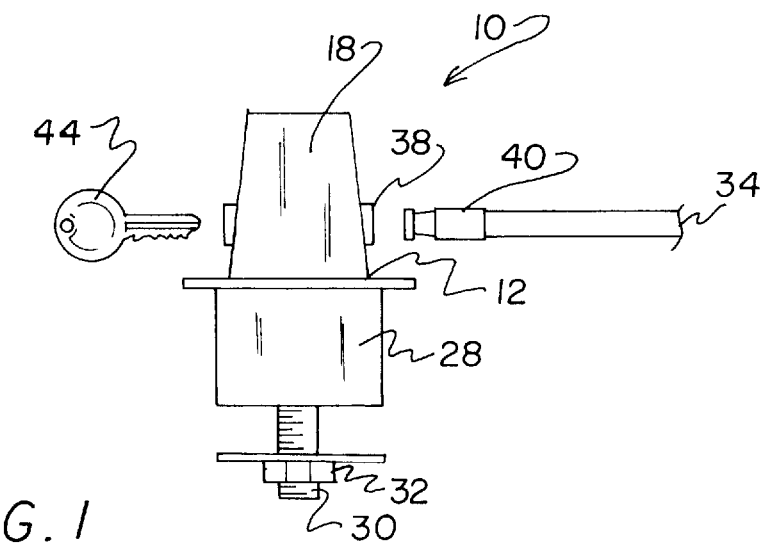
FIG. 1 is a side view of a new cargo protecting security cable for pickup trucks illustrating the first anchor portion according to the present invention.
Figure 2:
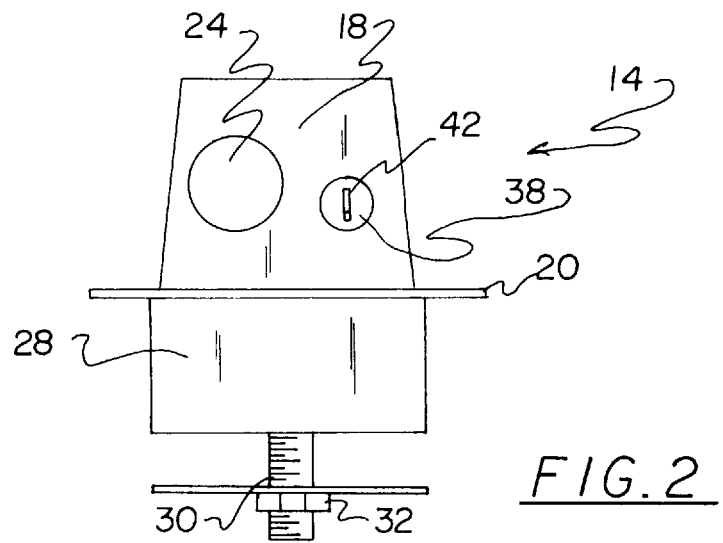
FIG. 2 is a front view of the first anchor portion of the present invention.
Figure 3:
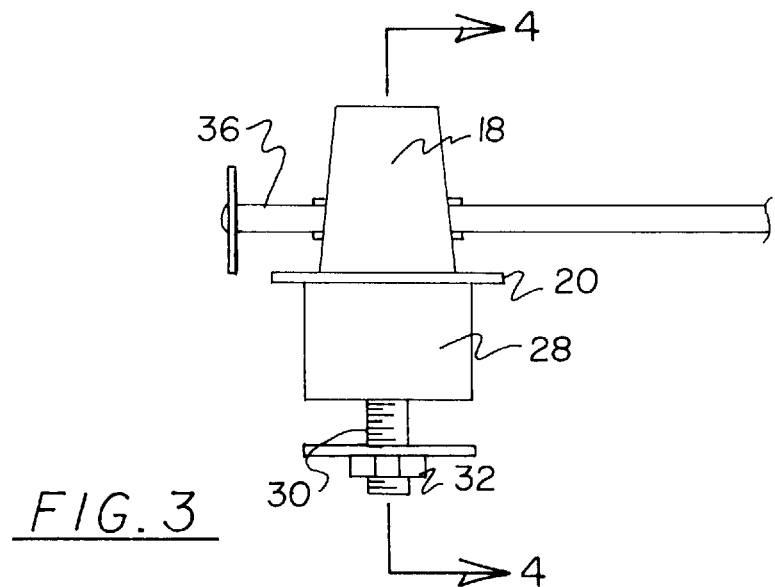
FIG. 3 is a side view of the second anchor portion of the present invention.
Figure 4:
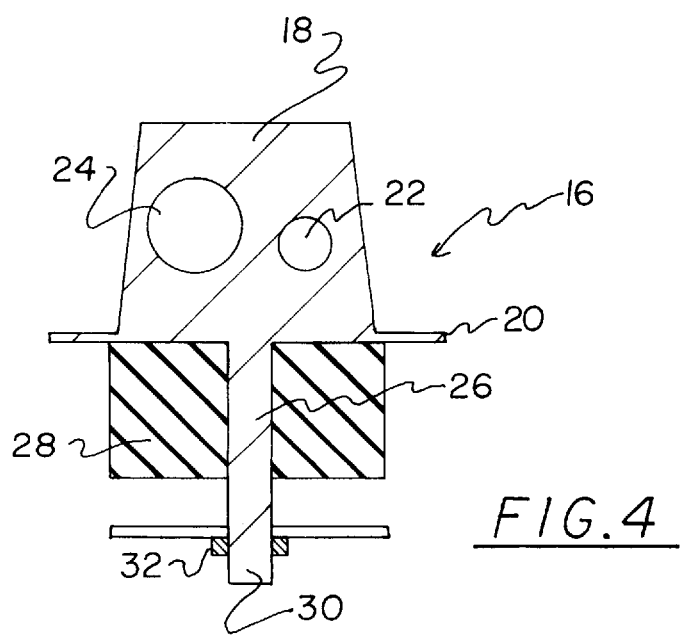
FIG. 4 is a cross-sectional view of the present invention as taken along line 4—4 of FIG. 3.

With reference now to the drawings, and in particular to FIGS. 1 through 4 thereof, a new cargo protecting security cable for pickup trucks embodying the principles and concepts of the present invention and generally designated by the reference numeral 10 will be described.

As best illustrated in FIGS. 1 through 4, the cargo protecting security cable for pickup trucks 10 comprises a pair of anchor portions 12 securable within opposing stake pockets of a pickup truck bed. The pair of anchor portions 12 include a first anchor portion 14 and a second anchor portion 16. The pair of anchor portions 12 each have an upper portion 18. The upper portion 18 has a flange 20 integral with a lower end of the upper portion 18. The flange 20 has a width greater than a diameter of the stake pockets. The upper portion 18 has a pair of apertures therethrough. The pair of apertures include a small aperture 22 and a large aperture 24. The flange 20 has a threaded bolt 26 extending downwardly therefrom. A rubber block 28 is secured around the threaded bolt 26 with a free end 30 extending beyond the rubber block 28. The rubber block 28 is dimensioned for being received within the stake pockets. A locking nut 32 couples with the free end 30 of the bolt 26 whereby tightening of the nut 32 against the rubber block 28 would expand the rubber block 28 thereby precluding removal thereof from the stake pocket. The large apertures 24 are used as a standard tie down hole for utilizing with other applications.

A locking cable 34 extends between the small apertures 22 of the pair of anchor portions 12. A first end 36 of the locking cable 34 extends through the small aperture 22 of the second anchor portion 16 and is fixedly secured thereto. The small aperture 22 of the first anchor portion 14 has a locking cylinder 38 disposed therein. The locking cylinder 38 receives a second end 40 of the locking cable 34 in a locked orientation. The locking cylinder 38 has a key slot 42 extending therein for receiving a key 44 whereby turning of the key 44 within the key slot 42 will release the second end 40 of the locking cable 34 from the locking cylinder 38.

In use, the pair of anchors 12 would slide down into the stake pockets of the pickup truck bed so they can be tightened into place. The rubber blocks 28 would swell in the stake pockets when squeezed together from top to bottom by the locking nut 32. The locking cylinder 38 on the first anchor portion 14 enables the locking cable 34 to be easily secured or unlocked by the pickup truck owner. The locking cable 34 could be used to lock furniture, a chain saw, lawn mowers, a pet on a short leash, a generator, or a personal watercraft in the bed of the truck while the owner is away. Upon returning to the truck, the cargo could be unlocked with the key 44 for use of the equipment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new cargo protecting security cable for pickup trucks for securing belongings carried in a bed on an uncovered pickup truck comprising, in combination:

a pair of anchor portions securable within opposing stake pockets of a pickup truck bed, the pair of anchor portions including a first anchor portion and a second anchor portion, the pair of anchor portions each having an upper portion, the upper portion having a flange integral with a lower end of the upper portion, the flange having a width greater than a diameter of the stake pockets, the upper portion having a pair of apertures therethrough, the pair of apertures including a small aperture and a large aperture, the flange having a threaded bolt extending downwardly therefrom, a rubber block secured around the threaded bolt with a free end extending beyond the rubber block, the rubber block being dimensioned for being received within the stake pockets, a locking nut coupling with the free end of the bolt whereby tightening of the nut against the rubber block would expand the rubber block thereby precluding removal thereof from the stake pocket; and a locking cable extending between the small apertures of the pair of anchor portions, a first end of the locking cable extending through the small aperture of the second anchor portion and being fixedly secured thereto, the small aperture of the first anchor portion having a locking cylinder disposed therein, the locking cylinder receiving a second end of the locking cable in a locked orientation, the locking cylinder having a key slot extending therein for receiving a key whereby turning of the key within the key slot will release the second end of the locking cable from the locking cylinder.

2. A new cargo protecting security cable for pickup trucks for securing belongings carried in a bed on an uncovered pickup truck comprising, in combination:

a pair of anchor portions securable within opposing stake pockets of a pickup truck bed and having a pair of apertures therethrough; and a locking cable extending between small apertures of said pair of apertures of the pair of anchor portions, a first end of the locking cable extending through the small aperture of the second anchor portion and being fixedly secured thereto, the small aperture of the first anchor portion having a locking cylinder disposed therein, the locking cylinder receiving a second end of the locking cable in a locked orientation.

3. The cargo protecting security cable as set forth in claim 2 wherein the locking cylinder has a key slot extending therein for receiving a key whereby turning of the key within the key slot will release the second end of the locking cable from the locking cylinder.

4. The cargo protecting cable as set forth in claim 2 wherein the pair of anchor portions each have an upper portion, the upper portion having a flange integral with a lower end of the upper portion, the flange having a width greater than a diameter of the stake pockets, the upper portion having the pair of apertures therethrough, the pair of apertures including one of said small apertures and a large aperture, the flange having a threaded bolt extending downwardly therefrom, a rubber block secured around the threaded bolt with a free end extending beyond the rubber block, the rubber block being dimensioned for being received within the stake pockets, a locking nut coupling with the free end of the bolt whereby tightening of the nut against the rubber block would expand the rubber block thereby precluding removal thereof from the stake pocket.

\* \* \* \* \*